(12) United States Patent
Hegna

(10) Patent No.: US 8,456,950 B2
(45) Date of Patent: Jun. 4, 2013

(54) METHOD FOR WAVE DECOMPOSITION USING MULTI-COMPONENT MOTION SENSORS

(75) Inventor: Stian Hegna, Høvik (NO)

(73) Assignee: PGS Geophysical AS, Lysaker (NO)

( * ) Notice: Subject to any disclaimer, the term of this patent is extended or adjusted under 35 U.S.C. 154(b) by 250 days.

(21) Appl. No.: 12/804,837

(22) Filed: Jul. 30, 2010

(65) Prior Publication Data
US 2012/0026829 A1    Feb. 2, 2012

(51) Int. Cl.
*G01V 1/38* (2006.01)
(52) U.S. Cl.
USPC ............................................. 367/24; 367/21
(58) Field of Classification Search
USPC ...................................... 367/21, 24
See application file for complete search history.

(56) References Cited

U.S. PATENT DOCUMENTS

| | | | | |
|---|---|---|---|---|
| 5,621,699 | A * | 4/1997 | Rigsby et al. | 367/22 |
| 6,061,298 | A * | 5/2000 | Madtson et al. | 367/21 |
| 7,336,561 | B2 | 2/2008 | Børresen et al. | |
| 7,359,283 | B2 | 4/2008 | Vaage et al. | |
| 7,379,386 | B2 * | 5/2008 | Muyzert et al. | 367/63 |
| 7,505,361 | B2 | 3/2009 | Søllner | |
| 7,646,672 | B2 | 1/2010 | Klüver | |
| 7,684,281 | B2 | 3/2010 | Vaage et al. | |
| 2008/0008039 | A1 * | 1/2008 | Robertsson et al. | 367/24 |
| 2009/0238036 | A1 * | 9/2009 | Robertsson et al. | 367/24 |
| 2010/0091610 | A1 | 4/2010 | Søllner | |
| 2010/0124148 | A1 | 5/2010 | Klüver et al. | |
| 2010/0172208 | A1 * | 7/2010 | Belani et al. | 367/21 |
| 2010/0182873 | A1 | 7/2010 | Klüver | |
| 2011/0182140 | A1 * | 7/2011 | Lambert et al. | 367/24 |
| 2011/0305108 | A1 * | 12/2011 | Goujon | 367/24 |

FOREIGN PATENT DOCUMENTS

| | | |
|---|---|---|
| GB | 2 448 206 A | 10/2008 |
| WO | WO 2008/008651 A2 | 1/2008 |

OTHER PUBLICATIONS

Partial European Search Report, date mailed: May 22, 2012.
Partial European Search Report, date mailed: Dec. 29, 2011.
Florian Wehland, Extended European Search Report, Date of Mailing: Sep. 10, 2012.

* cited by examiner

*Primary Examiner* — Cassie Galt

(57) ABSTRACT

Three-axis velocity data, obtained along with pressure data in a marine seismic survey, are rotated to a ray direction. Plane wave decomposition is applied in the ray direction to the rotated velocity data. The pressure data and the velocity data are combined to generate at least one of up-going and down-going wave fields. The at least one of up-going and down-going wave fields are used in a time-space domain to image the earth's subsurface.

12 Claims, 4 Drawing Sheets

METHOD FOR WAVE DECOMPOSITION USING MULTI-COMPONENT MOTION SENSORS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of imaging dual-sensor marine seismic streamer data.

2. Description of the Related Art

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable. An alternative to having the geophone and hydrophone co-located, is to have sufficient spatial density of sensors so that the respective wavefields recorded by the hydrophone and geophone can be interpolated or extrapolated to produce the two wavefield signals at the same location.

After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure signals. The waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal limiting the bandwidth of the recorded data. Because of the influence of the surface reflection, some frequencies in the recorded signal are amplified and some frequencies are attenuated.

A particle motion sensor, such as a geophone, has a directional response, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection. Conventional techniques for deghosting often include combining the pressure and vertical particle velocity wavefields to separate one of the pressure or vertical particle velocity wavefields into at least one of up-going and down-going wavefield components.

The measurements made by motion sensors in towed streamer cables for measuring the particle motion associated with pressure waves are vector measurements. Therefore, unlike pressure measurements, the recorded amplitudes are dependent upon the incidence angle relative to the vector measurement direction. If the vertical velocity field is being measured, then the recorded amplitudes are proportional to the cosine of the incidence angle relative to the vertical. With single component motion sensors, this angle dependency has to be corrected for before the velocity field can be combined with the total pressure field to separate up-going and down-going wave-fields. One way of doing this angle dependent amplitude correction is to decompose the measured data into plane-waves, and then divide the amplitudes by the cosine of the angle of each plane wave. At a zero degree emission angle, the measurement direction is in the same direction as the particle motion, and no correction is needed to the amplitudes after decomposing into plane-waves.

There are several limitations with this conventional method. The method requires data that are densely sampled spatially, in both the in-line and cross-line directions, in order to avoid aliasing in the plane-wave decomposition. In addition, the signal to noise ratio tends to decrease with increasing incidence angles. The signals of interest decrease in amplitude with increasing angle as described above, whereas noise related to mechanical vibrations in the streamers does not follow the same angle dependency as the signal because the noise propagate with a slower velocity along the streamer compared to acoustic energy, and aliasing tends to occur at relatively low frequencies. Such noise tends to be spread over the entire angle range of interest. Hence, the signal level relative to the noise level tends to decrease with increasing angle.

Thus, a need exists for a method for separating the pressure or vertical velocity fields into at least one of up-going and down-going wavefield components without requiring dense spatial sampling, especially in the cross-line direction, and without requiring knowledge of the incidence angles.

BRIEF SUMMARY OF THE INVENTION

The invention is a method for imaging the earth's subsurface. Three-axis velocity data, obtained along with pressure data in a marine seismic survey, are rotated to a ray direction. Plane wave decomposition is applied in the ray direction to the rotated velocity data. The pressure data and the velocity data are combined to generate at least one of up-going and down-going wave fields. The at least one of up-going and down-going wave fields are used in a time-space domain to image the earth's subsurface.

BRIEF DESCRIPTION OF THE DRAWINGS

The invention and its advantages may be more easily understood by reference to the following detailed description and the attached drawings, in which.

Figure 1:
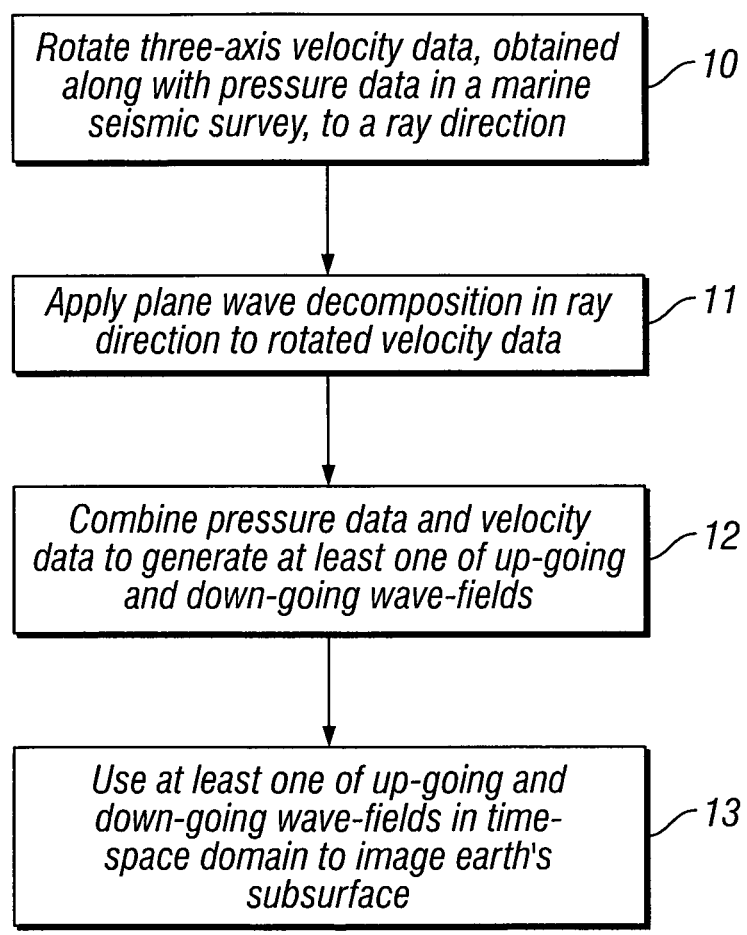
FIG. 1 is a flowchart illustrating an embodiment of the method of the invention for imaging the earth's subsurface.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for imaging the earth's subsurface using at least one of up-going and down-going pressure and velocity wave-fields. In particular, the invention is a method for using three-axis motion sensor measurements and pressure sensor measurements obtained during a marine seismic survey to generate the at least one of up-going and down-going pressure and velocity wave-fields. In the invention, it is not necessary to use the incidence angle to account for the directional velocity measurements. Instead, the velocity measurements are rotated to match the ray directions of plane waves separated through a plane wave decomposition.

The seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface. The processing and display of acquired seismic data facilitates more accurate decisions on whether and where to drill, and thereby reduces the risk of drilling dry holes.

Particle motion sensors are typically particle velocity sensors, but other particle motion sensors, including particle acceleration sensors, may be used instead of particle velocity sensors in dual sensor streamers. Particle velocity sensors are commonly known in the art as geophones and particle acceleration sensors are commonly known in the art as accelerometers. The present invention will be described with embodiments employing geophones, but this sensor choice is for simplicity of illustration only and is not intended to be a restriction of the invention.

While a hydrophone records the total wavefield omni-directionally, a vertical geophone, as typically utilized in seismic processing, only records the vertical component of the wavefield uni-directionally. The vertical component of the wavefield will only be equal to the total wavefield for signals that happen to be propagating vertically downward. If $\theta$ is the angle of incidence between the signal wave front and the sensor orientation, then vertical upward propagation is conventionally defined by incidence angle θ=0.

If the vertical and two orthogonal horizontal particle velocity components are known from measurement, in addition to the pressure wavefield, then the particle velocity components may be calculated by rotation from an initially different coordinate system. Then, by the method of the invention, the at least one of up-going and down-going components of the pressure and vertical velocity fields can be determined without knowledge of the incidence angles.

FIG. 1 is a flowchart illustrating an embodiment of the method of the invention for imaging the earth's subsurface.

At block 10, three-axis velocity data, obtained along with pressure data in a marine seismic survey, are rotated to a ray direction.

At block 11, a plane wave decomposition is applied in the ray direction to the rotated velocity data from block 10.

At block 12, the pressure data and the velocity data from block 11 are combined to generate at least one of up-going and down-going wave fields.

At block 13, the at least one of up-going and down-going wave fields from block 12 are used in the time-space domain to image the earth's subsurface.

Figure 2:
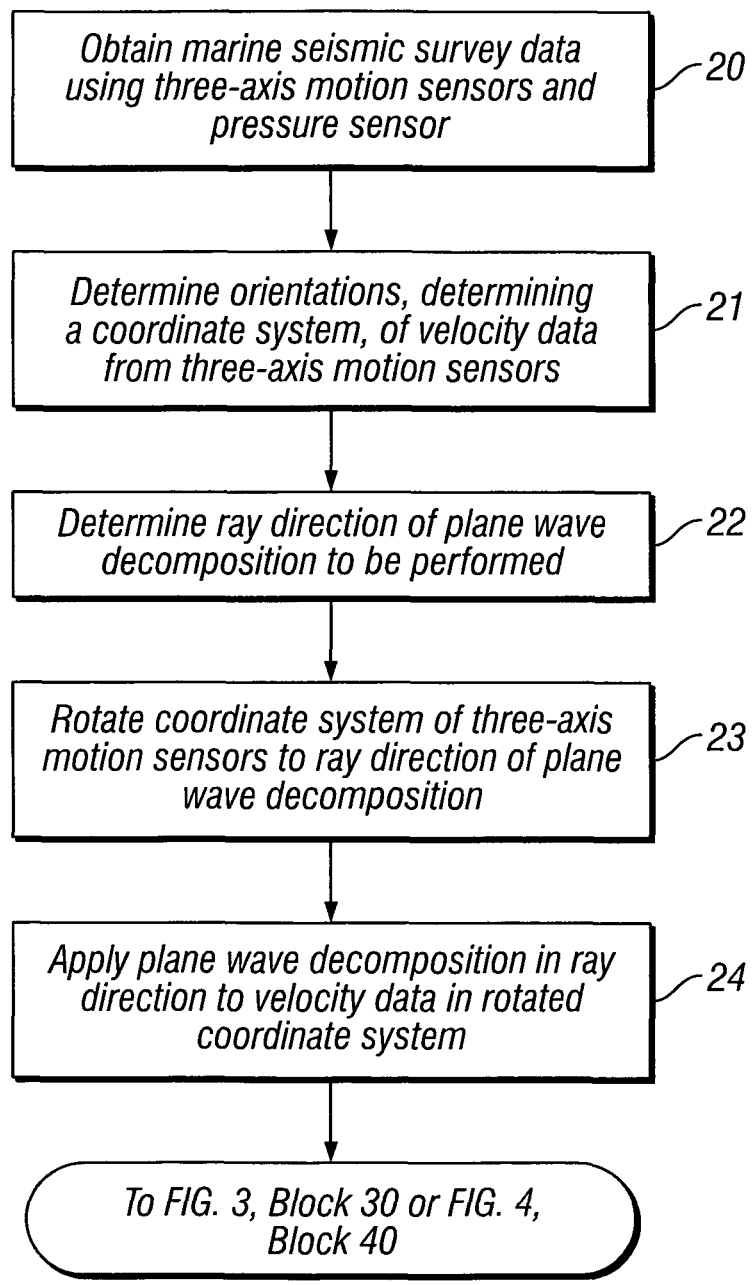
FIG. 2 is a flowchart illustrating an initial portion of another embodiment of the method of the invention for imaging the earth's subsurface.
Figure 3:
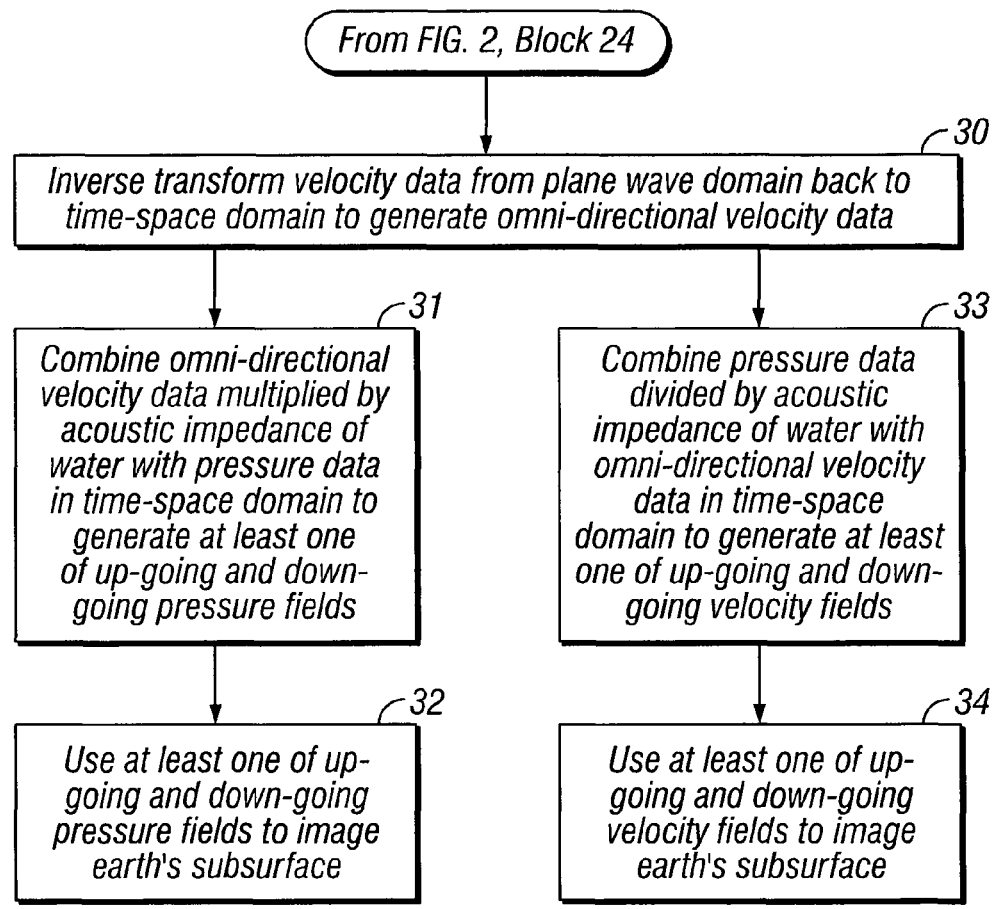
FIG. 3 is a flowchart illustrating a final portion of one embodiment of the method of the invention begun in FIG. 2.
Figure 4:
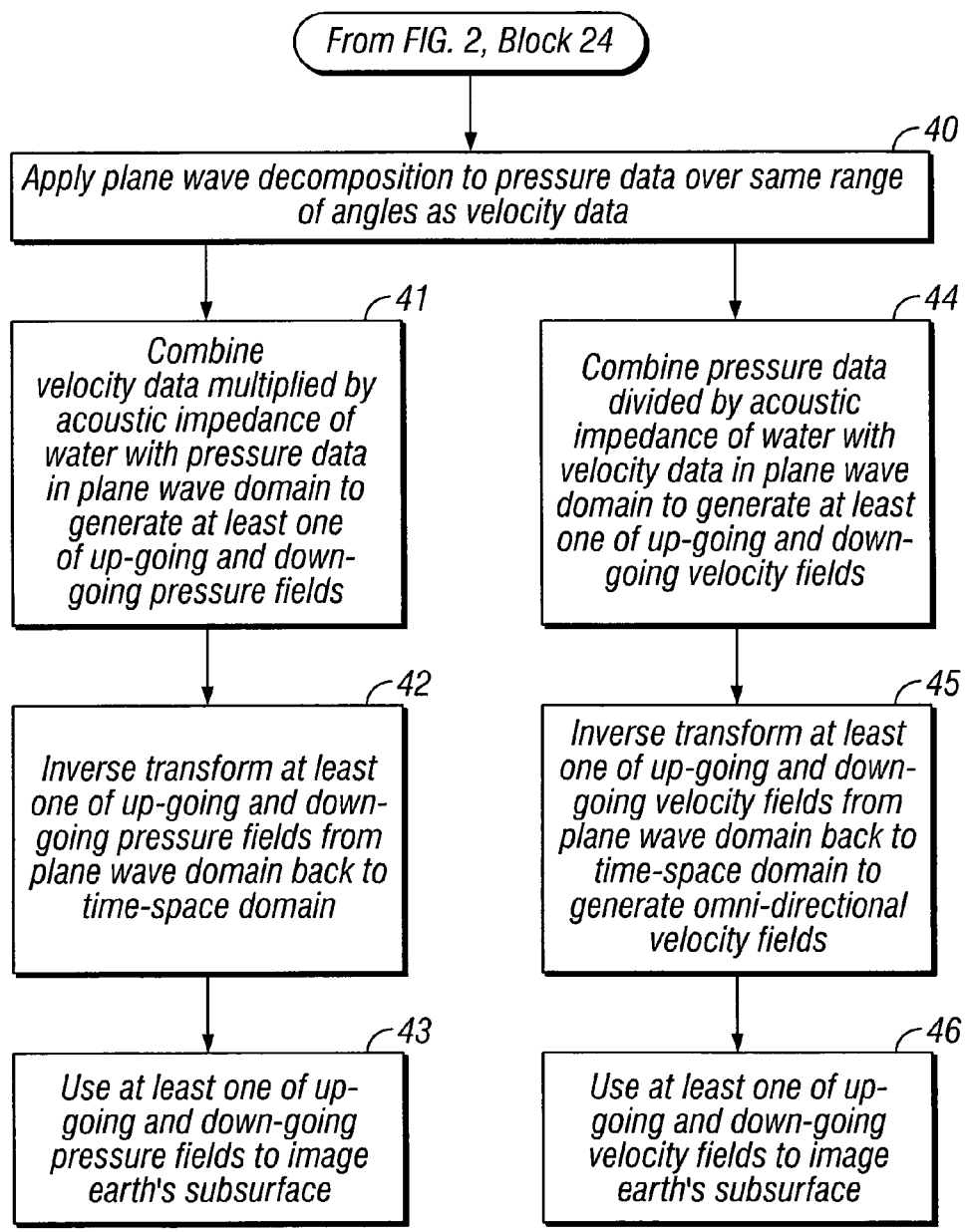
FIG. 4 is a flowchart illustrating a final portion of an alternative embodiment of the method of the invention begun in FIG. 2.

FIGS. 2 to 4 illustrate in more detail the invention shown in general in FIG. 1.

FIG. 2 is a flowchart illustrating an initial portion of another embodiment of the method of the invention for imaging the earth's subsurface.

At block 20, marine seismic data are obtained using three-axis motion sensors and a pressure sensor. If the motion sensors are accelerometers instead of geophones, then the accelerometer measurements need to be integrated in order to provide the data in the form of velocity data. This integration can be accomplished by computational methods well-known in the art. Then, the three axis motion sensors generate directional particle velocity data and the pressure sensor generates omni-directional pressure data. Obtaining the seismic data includes retrieving previously acquired data from storage, such as computer memory or other types of memory storage devices or media.

At block 21, orientations of the three-axis motion sensors from block 20 are determined. These orientations determine a Cartesian coordinate system for the velocity data from block 20, oriented in the directions of the three motion sensors. Typically, the three motion sensors comprise a vertical sensor and two orthogonal horizontal sensors. Typically, the two horizontal sensors are oriented in the inline and cross-line directions. These conventional orientations are convenient and may aid in computational efficiency, but are not to be considered a limitation of the invention. In one embodiment, these motion sensors comprise gimbaled geophones or accelerometers. The gimbal mechanisms automatically bring the sensors to a specified orientation, such as the orthogonal vertical and horizontal directions described above.

In another embodiment, the motion sensors are accelerometers that are not gimbaled, so that the orientation of the sensors is not already known. In this case, the orientation of the sensors need to be determined, either from the DC components of the measured accelerations or from inclinometer sensors or any other appropriate sensors. In addition, gyro measurements may be used to determine variation in orientation.

At block 22, the ray direction of the plane wave decomposition to be performed is determined.

At block 23, the coordinate system of the three-axis motion sensors from block 21 is rotated to conform to the ray direction of the plane wave decomposition determined in block 22.

In one embodiment, the rotation is done as vector rotation through the use of rotation matrices.

With three-axis motion sensors, such as velocity sensors (geophones) or accelerometers, in which the orientation of the sensors and each of their vertical and horizontal components is known, the coordinate system can be rotated to any orientation. Therefore with three-axis motion sensors, the velocity field in any direction can be derived through vector rotation.

At block 24, plane wave decomposition is applied to the velocity data in the rotated coordinate system from block 23 in the ray direction from block 22. The coordinate system of the three-axis velocity measurements is rotated along with the plane-wave decomposition such that one of the axes is pointing in the same direction as the ray direction of the plane wave being decomposed in all sensor positions. This axis or velocity vector is then used to do the plane wave decomposition.

The velocity vector used for plane wave de-composition is now in the same direction as the direction of the particle motion associated with the plane wave representation of pressure waves. Since the vector measurement is always pointing in the same direction as the particle motion, there is no need for further angle dependent amplitude corrections, as would be necessary in conventional processing. Also, since the velocity vectors are oriented in the same direction as the particle motion, the amplitudes of the signals in each plane-wave direction are maximized through the vector rotation along with the plane-wave decomposition, thus maximizing the signal to noise ratio.

The plane-wave decomposition can be done through a linear Radon transform where signals are summed along planes of known angles. The particle velocity measurements have already been rotated such that the velocity vectors are in the same direction as the ray direction of the plane wave. The rotation and summation along planes of known angles are repeated over the angle ranges of interest. This can be done either in the time domain or the frequency domain.

At this point, the process proceeds to either block 30 of FIG. 3 or block 40 of FIG. 4 with the velocity data. The flowcharts in FIGS. 3 and 4 illustrate two alternative embodiments for ending the process begun in FIG. 2.

FIG. 3 is a flowchart illustrating a final portion of one embodiment of the method of the invention begun in FIG. 2.

At block 30, the velocity data from block 24 of FIG. 2 is inverse transformed from the plane wave domain back to the time-space domain. After the data are transformed back into time and space, the result is an omni-directional velocity field. In particular, no further corrections for incidence angle are performed because, in the method of the invention, no further corrections are necessary. In one embodiment, the inverse transform is an inverse linear Radon transform.

Provided that the spatial sampling of the sensor measurements is sufficiently dense, and the forward and inverse plane-wave decomposition can be done without artifacts, the inverse transform can be done to locations other than the original sensor locations. Therefore, it is not a requirement of the invention to have co-located pressure and motion sensors.

At this point, the process may proceed as several embodiments, two of which are illustrated here. In the first embodiment, the process proceeds to block 31 to generate at least one of up-going and down-going pressure fields. In the second embodiment, the process proceeds to block 33 to generate at least one of the up-going and down-going velocity fields. In either embodiment, the resulting at least one of the up-going and down-going wave-fields are utilized to image the earth's subsurface.

At block 31, the transformed omni-directional velocity field from block 30 is multiplied by acoustic impedance of water and then combined with the total pressure field in the time-space domain. This combination generates at least one of the up-going and down-going pressure wave-fields in the time space domain. The acoustic impedance of water is a product of the water velocity and density at the sensor location.

Thus, in one embodiment, the up-going and down-going pressure wavefields $P^u$ and $P^d$ are given in terms of the measured pressure P and the omni-directional velocity V by:

$$P^u = \frac{1}{2}[P - \rho c V] \qquad (1)$$

and $$P^d = \frac{1}{2}[P + \rho c V]. \qquad (2)$$

Here, the factor $\rho c$ is the acoustic impedance of water, where $\rho$ is the density of water and c is the acoustic velocity of water. Note that in the method of the invention, as expressed, for example, in Equations (1) and (2), there is no explicit incidence angle dependence.

At block 32, the at least one of the up-going and down-going pressure fields generated in block 31 are used for imaging the earth's subsurface. The process ends for this embodiment.

At block 33, in an alternative embodiment, the total pressure field is be divided by the acoustic impedance of water and then combined with the omni-directional velocity field in the time-space domain in order to derive the at least one of the up-going and down-going velocity fields in the time-space domain.

In one embodiment, the up-going and down-going velocity wavefields $V^u$ and $V^d$ are given in terms of the measured pressure P and the omni-directional velocity V by:

$$V^u = \frac{1}{2}\left[V - \frac{1}{\rho c}P\right] \qquad (3)$$

and $$V^d = \frac{1}{2}\left[V + \frac{1}{\rho c}P\right]. \qquad (4)$$

Again, in the method of the invention, as expressed, for example, in Equations (3) and (4), there is no explicit incidence angle dependence.

At block 34, the at least one of the up-going and down-going velocity fields from block 33 are used for imaging the earth's subsurface. The process ends for this embodiment.

FIG. 4 is a flowchart illustrating a final portion of an alternative embodiment of the method of the invention begun in FIG. 2.

At block 40, in another embodiment of the invention, plane-wave decomposition is applied to the total pressure field over the same angle ranges as the velocity fields in block 24 of FIG. 2.

At this point, the process may proceed as several embodiments, two of which are illustrated here. In the first embodiment, the process proceeds to block 41 to generate at least one of the up-going and down-going pressure fields. In the second embodiment, the process proceeds to block 44 to generate at least one of the up-going and down-going velocity fields.

At block 41, the decomposed rotated velocity data from block 24 of FIG. 2 are multiplied by acoustic impedance of water and combined in the plane wave domain with the decomposed pressure data from block 40. This combination generates at least one of the up-going and down-going pressure wave-fields in the plane wave domain. In one embodiment, Equations (1) and (2) are employed.

At block 42, the at least one of the up-going and down-going pressure fields from block 41 are inverse transformed from the plane wave domain back to the time-space domain.

At block 43, the at least one of the up-going and down-going pressure fields from block 42 are used for imaging the earth's subsurface. The process ends for this embodiment.

At block 44, in an alternative embodiment, the decomposed pressure field from block 40 is be divided by the acoustic impedance of water and then combined in the plane wave domain with the decomposed rotated velocity field in order to derive the at least one of the up-going and down-going velocity fields in the plane wave domain. In one embodiment, Equations (3) and (4) are employed.

At block 45 the separated at least one of the up-going and down-going velocity fields are inverse transformed from the plane wave domain back into the time-space domain to generate at least one of omni-directional up-going and down-going velocity fields.

At block 46, the at least one of the omni-directional up-going and down-going velocity fields from block 43 are used for imaging the earth's subsurface. The process ends for this embodiment.

The described methodology does not require any user interaction, and may as such be applied in data processing centers or onboard vessels as one of the first processing steps, or during the process of data acquisition.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for imaging the earth's subsurface using a programmable computer that is programmed to perform the following:
   rotating three-axis velocity data, obtained along with pressure data in a marine seismic survey, to a ray direction of a velocity direction associated with a plane wave domain representation of the pressure data;
   applying plane wave decomposition in the ray direction to the rotated velocity data;
   combining the pressure data and the decomposed and rotated velocity data to generate at least one of up-going and down-going wave-fields; and
   using the at least one of up-going and down-going wave-fields in a time-space domain to image the earth's subsurface.

2. The method of claim 1, wherein the rotating three-axis velocity data comprises:
   obtaining marine seismic data using three-axis motion sensors and a pressure sensor;
   determining orientations of the three-axis motion sensors;
   determining the ray direction of the plane wave decomposition to be performed; and
   rotating the coordinate system of the three-axis motion sensors to conform to the ray direction of the plane wave decomposition.

3. The method of claim 2, wherein the three-axis motion sensors comprise three-axis geophones.

4. The method of claim 2, wherein the three-axis motion sensors comprise three-axis accelerometers.

5. The method of claim 4, further comprising integrating accelerometer data to provide the three-axis velocity data.

6. The method of claim 2, wherein the rotating the coordinate system of the three-axis motion sensors comprises:
   applying vector rotation through use of rotation matrices.

7. The method of claim 1, wherein the applying plane wave decomposition further comprises: inverse transforming the decomposed and rotated velocity data from the plane wave domain back to the time-space domain to generate omni-directional velocity data.

8. The method of claim 7, wherein the combining the pressure data and decomposed and rotated velocity data comprises:
   multiplying the omni-directional velocity data by the acoustic impedance of water to generate scaled velocity data; and
   combining the scaled velocity data with the pressure data in the time-space domain.

9. The method of claim 7, wherein the combining the pressure data and decomposed and rotated velocity data comprises:
   dividing the pressure data by the acoustic impedance of water to generate scaled pressure data; and
   combining the scaled pressure data with the omni-directional velocity data in a time-space domain.

10. The method of claim 1, wherein the applying plane wave decomposition further comprises:
    applying plane wave decomposition in the ray direction to the pressure data.

11. The method of claim 7, wherein the combining the pressure data and the decomposed and rotated velocity data further comprises:
    multiplying the decomposed and rotated velocity data by the acoustic impedance of water to generate scaled velocity data;
    combining the scaled velocity data with the pressure data in a the plane wave domain, generating the at least one of up-going and down-going wave-fields; and
    inverse transforming the at least one of up-going and down-going wave-fields from the plane wave domain back to the time-space domain.

12. The method of claim 7, wherein the combining the pressure data and the decomposed and rotated velocity data further comprises:
    dividing the pressure data by the acoustic impedance of water to generate scaled pressure data;
    combining the scaled pressure data with the decomposed and rotated velocity data in the plane wave domain, generating the at least one of up-going and down-going wave-fields; and
    inverse transforming the at least one of up-going and down-going wave-fields from the plane wave domain back to the time-space domain.

* * * * *